United States Patent
Kadoya

[11] Patent Number: 5,887,137
[45] Date of Patent: Mar. 23, 1999

[54] DATA PROCESSING APPARATUS HAVING A SORTING UNIT TO PROVIDE SORTED DATA TO A PROCESSOR

[75] Inventor: Hitoshi Kadoya, Ikeda, Japan

[73] Assignee: Ricoh Company, Ltd., Tokyo, Japan

[21] Appl. No.: 900,473

[22] Filed: Jul. 25, 1997

[30] Foreign Application Priority Data

Jul. 29, 1996 [JP] Japan .................................. 8-198694

[51] Int. Cl.$^6$ ...................................................... G06F 13/38
[52] U.S. Cl. ................ 395/200.41; 395/872; 395/800.34
[58] Field of Search ................................. 395/872, 873, 395/874, 875, 876, 877, 200.38, 200.39, 200.4, 200.41, 800.34, 800.35

[56] References Cited

U.S. PATENT DOCUMENTS

| | | | |
|---|---|---|---|
| 4,138,732 | 2/1979 | Suzuki et al. | 395/872 |
| 4,700,292 | 10/1987 | Campanini | 395/200.41 |
| 4,821,185 | 4/1989 | Esposito | 395/872 |
| 4,860,244 | 8/1989 | Bruckert et al. | 395/872 |
| 5,305,446 | 4/1994 | Leach et al. | |
| 5,390,304 | 2/1995 | Leach et al. | |
| 5,410,652 | 4/1995 | Leach et al. | |
| 5,740,406 | 4/1998 | Rosenthal et al. | 395/872 |

FOREIGN PATENT DOCUMENTS 4-273366  of 1992  Japan .

*Primary Examiner*—Richard L. Ellis
*Attorney, Agent, or Firm*—Dickstein Shapiro Morin & Oshinsky LLP

[57] ABSTRACT

A data processing apparatus reduces the number of steps performed by a processor so as to achieve a high-speed operation. A data memory, which stores data to be calculated by the processor, includes a first memory part and a second memory part each of which is connected to the same data bus and address bus. An address structure of the second memory part is identical to an address structure of the first memory part. One of first address data output from the processor and second address data provided from an external device is selectively provided to the first and the second memory parts so that the first address data is provided to the first memory part when the second address data is provided to the second memory part, and vice versa. A sort circuit rearranges the data output from the processor in a predetermined order so that the rearranged data is provided to the processor in the order of use by the processor. The data output from the processor and data from the external device is selectively provided to the first and second memory parts so that the data output from the processor is provided to the first memory part when the data from the external device is provided to the second memory parts, and vice versa.

11 Claims, 9 Drawing Sheets

FIG.1
PRIOR ART

INPUT DATA { A B C D E F  ARRANGED IN THE ORDER OF CALCULATION

ORDER OF USE
A 1
B 2     RESULT OF        a
C 3     CALCULATION      b
D 4     ⟶                c
E 5                      d
F 6                      e

ADDRESS SET BY DSP

SET ADDRESS OF "A"
USE "A"  <AUTOMATIC INCREMENT
USE "B"  <AUTOMATIC INCREMENT
USE "C"  <AUTOMATIC INCREMENT
USE "D"  <AUTOMATIC INCREMENT
USE "E"  <AUTOMATIC INCREMENT
USE "F"

ORDER OF USE IN THE NEXT OPERATION a 5
b 2
c 1
d 3
e 4

ADDRESS SET BY DSP

SET ADDRESS OF "c"
USE "c"
SET ADDRESS OF "b"
USE "b"
SET ADDRESS OF "d"
USE "d"  <AUTOMATIC INCREMENT
USE "e"
SET ADDRESS OF "a"
USE "a"

INPUT DATA

A  RESULT OF
   CALCULATION
B  ————————→ C

OPERATION OF DSP

- WRITE "C" IN OUTPUT REGISTER ————┐
  WRITE "C" IN INTERNAL RAM          │
  OTHER OPERATIONS                   CALCULATION BY
- CALCULATION USING "C"              EXTERNAL DEVICE
  OTHER OPERATIONS                   │
- CALCULATION USING RESULT OF        │
  CALCULATION BY EXTERNAL DEVICE ←——┘

INPUT DATA

A   RESULT OF
    CALCULATION
B   ⎯⎯⎯⎯⎯⎯⎯→ C

OPERATION OF DSP

• C(WRITE DATA IN ADDITIONAL ⎯⎯⎯⎯⎯⎯⎯⎯⎯⎯⎯┐
  REGISTER AN INTERNAL RAM)                                ↓
  OTHER OPERATIONS                              CALCULATION BY
• CALCULATION USING C                          EXTERNAL PROCESSOR
  OTHER OPERATIONS
• CALCULATION USING RESULT OF
  CALCULATION BY EXTERNAL PROCESSOR ←⎯⎯⎯⎯⎯⎯

FIG.12

| FIRST CONVENTIONAL APPARATUS | FIRST OPERATION | OUTPUT | SECOND OPERATION |

| SECOND CONVENTIONAL APPARATUS | FIRST OPERATION | OUTPUT | SECOND OPERATION |

| PRESENT INVENTION | FIRST OPERATION | SECOND OPERATION |
|  | OUTPUT |  | ized image processing application such as polygon processing, a
DATA PROCESSING APPARATUS HAVING A SORTING UNIT TO PROVIDE SORTED DATA TO A PROCESSOR

BACKGROUND OF THE INVENTION

1. Field of the Invention

The present invention generally relates to a data processing apparatus and, more particularly, to a data processing apparatus having a data memory device which can be efficiently accessed by a processor.

2. Description of the Related Art

A data processing apparatus generally comprises a processor, a program RAM which stores programs and a data RAM which stores data to be processed. The processor reads the data in the data RAM in accordance with the programs stored in the program RAM so as to process or calculate the read data. The processed data is restored in the data RAM or stored in an external memory device.

In a geometry processing unit specific to a geometrical image processing application such as polygon processing, a digital signal processor (DSP) is used as a processor so as to perform specific calculations or operations at high speed. A description will be given below of a specific content of the process performed by such a unit.

1) Data to be supplied to a DSP is arranged in an order of use by the DSP. Thus, the DSP can perform calculations based on the data sequentially supplied thereto. That is, the DSP can perform a set of calculations by setting the address corresponding to the first data and the addresses for the rest of the data can be set by using an automatic incrementing function of the address.

2) When a different calculation is performed based on the result of a calculation, the result (resultant data) of the calculation is not arranged in the order of use by the DSP. That is, the order of addresses in which the resultant data is stored does not match the order of use by the DSP. Thus, the automatic incrementing function is not applicable to set the addresses for the resultant data. In the conventional data processing apparatus, the addresses must be reset every time the resultant data is used.

FIG. 1 is an illustration of an operation of the DSP mentioned above. For example, the data "A, B, C, D, E, F" are arranged in the order of use by the DSP. The result of calculation based on the data "A, B, C, D, E, F" is now assumed to be "a, b, c, d, e". Additionally, the order of use of the data "a, b, c, d, e" assumes that the data "a" is used fifth, the data "b" is used second, the data "c" is used first, the data "d" is used third, and the data "e" is used fourth. In such a case, the DSP sets the address of the resultant data "c" first to use the data "c", then, the DSP sets the address of the resultant data "b" to use the data "b", and so on.

A description will now be given of contents of another operation performed by the DSP.

3) The DSP performs calculations based on externally input data. The result of calculation is transferred to an external device, and simultaneously written in the internal data RAM.

4) In this case, the conventional data processing apparatus separately performs an operation for writing the resultant data in the internal data RAM and an operation for writing the resultant data in an output register to transfer the resultant data to the external device. Further calculations may be performed based on the resultant data stored in the internal data RAM, or calculations may be performed based on the data which was processed in the external device and returned to the data processing apparatus.

FIG. 2 is an illustration for explaining the operation described in the above items 3) and 4). For example, it is assumed that the result of calculation "C" is obtained by using the data "A, B". The result of calculation "C" is written in both the internal data RAM and the output register by separate operations. An additional calculation is performed by using the result of calculation "C". Additionally, the result of calculation "C" is processed by the external device, and the data processing apparatus performs a calculation using the result of the operation performed by the external device.

As mentioned above, in the conventional data processing apparatus, the address is set every time the results of a calculation is used, as appreciated from the operation described in the above-mentioned item 2). Thus, the number of steps performed by the DSP is large, and this prevents increase of the calculation speed of the DSP. Additionally, as appreciated from the operation of the above-mentioned item 4), since the results of a calculation is written in both the internal data RAM and the output register by separate operations, substantially the same writing operation is performed twice. This also increases the number of steps performed by the DSP, and there is a problem in that it is difficult to perform a high speed calculation.

The data processing apparatus disclosed in Japanese Laid-Open Patent Application No. 4-273366 is provided with two data RAMs which are switchable by a register. In this data processing apparatus, after data is read from one of the data RAMs and a calculation is performed on the read data and the result is stored in one of the data RAMs, the operation is switched to perform a similar operation with respect to the other one of the data RAMs. While the operation is performed with respect to the other one of the data RAMs, an external device or circuit can perform first the data stored in the first one of the data RAMS. Thus, a time spent on the input and output operation of the data stored in the data RAMs can be saved. However, this method is effective when the data in the data RAMs is sequentially read from the upper address. That is, the data stored in the data RAMs is not sequentially arranged, and the operation the above-mentioned item 2 is still required.

Additionally, if the data RAMs to be used can be switched as taught in the Japanese Laid-Open Patent Application No. 4-273366, the data to be used internally and externally can be written in one of the data RAMs so that the data stored in one of the data RAMs is read alternatively by the internal processor and the external device or circuit. This eliminates the duplicate writing operation for the data to be used by the internal processor and the external device. However, if the data RAMs are alternatively used, the switching of the data RAMs cannot be performed until the set of operations of the internal processor or the external device has been completed. This causes a new problem in that the interim result of a calculation cannot be used even when it is required. Thus, in this case, the result of a calculation must be written in each of the data RAM and the output register.

SUMMARY OF THE INVENTION

It is a general object of the present invention to provide an improved and useful data processing apparatus in which the above-mentioned problems are eliminated.

A more specific object of the present invention is to provide a data processing apparatus which reduces the number of steps performed by a processor provided therein so as to achieve a high-speed operation.

In order to achieve the above-mentioned objects, there is provided according to one aspect of the present invention a data processing apparatus comprising:

a processor connected to an address bus and a data bus;

a data memory storing data to be calculated by the processor, the data memory including a first memory part and a second memory part each of which is connected to the data bus and the address bus, an address structure of the second memory part being identical to an address structure of the first memory part;

a first selector unit selectively providing one of first address data output from the processor and second address data provided from an external device to the first and the second memory parts so that the first address data is provided to the first memory part when the second address data is provided to the second memory part, and the second address data is provided to the first memory part when the first address data is provided to the second memory part;

a sort circuit which rearranges the data output from the processor in a predetermined order so that the rearranged data is provided to the processor in the order of use by the processor; and a second selector unit selectively providing the data output from the processor and data from the external device to the first and second memory parts so that the data output from the processor is provided to the first memory part when the data from the external device is provided to the second memory parts, and the data output from the processor is provided to the second memory part when the data from the external device is provided to the first memory part.

According to the above-discussed invention, when the processor is calculating the data in one of the first and second memory parts, other data which will be used in the next operation cycle of the processor is written in the other one of the first and second memory parts. Thus, the time spent on reading the data for the next operation cycle is eliminated. Additionally, the data provided to one of the first and second memory parts is also provided to the sort circuit so that the data is rearranged in the order of use by the processor. Thus, the processor can read the data output from the sort circuit in an ascending order of the address.

The data processing apparatus according to the present invention may further comprise a third selector unit selectively providing data stored in one of the first and second memory parts to one of the processor and the external device.

Additionally, the data processing apparatus according to the present invention may further comprise a fourth selector unit selectively providing to the processor one of the data to be provided to the processor and data from the sort circuit.

Further, the data processing apparatus according to the present invention may further comprise a register provided so as to control a selection of the first selector and the second selector.

Additionally, the data processing apparatus according to the present invention may further comprise a second data memory having the same structure as that of the data memory.

In one embodiment of the present invention, the processor is a digital signal processor.

The data processing apparatus according to the present invention may further comprise a program memory storing a program to be provided to the processor so that the processor calculates the data in accordance with the program. The program may be directed to geometrical processing.

Additionally, there is provided according to another aspect of the present invention a data processing apparatus comprising:

a processor;

a data memory storing data to be calculated by the processor;

a register unit storing data to be supplied to an external processing unit, the register unit including a plurality of registers;

an address decoder specifying one of the registers of the register unit in accordance with address data provided to the data memory; and a data supply line to provide data to be provided to the data memory to the register unit.

According to the above-mentioned invention, when the data is written in the address of the data memory, the data is also written in the register unit. The data stored in the register unit is stored in one of the registers which corresponds to the address of the data memory in which the data is written. Accordingly, the data to be used by the external device can be simultaneously stored in the register unit by one operation of the processor. Additionally, the external processing device can use the data without accessing the data memory. This allows use of the interim result of a calculation performed by the processor.

The register unit may have an address structure identical to at least a part of the data memory.

In one embodiment of the present invention, the data processing apparatus may further comprise a program memory storing a program to be used by the processor.

Other objects, features and advantages of the present invention will become more apparent from the following detailed description when read in conjunction with the accompanying drawings.

BRIEF DESCRIPTION OF THE DRAWINGS

FIG. 1 is an illustration for explaining a sequence of operations performed by a conventional data processing apparatus;

FIG. 12 is an illustration for explaining a difference in the number of steps performed by the processor provided in the data processing apparatus according to the second embodiment of the present invention and that of the processor provided in the conventional data processing apparatuses.

DETAILED DESCRIPTION OF THE PREFERRED EMBODIMENTS

A description will now be given of an embodiment according an embodiment of the present invention.

Figures 2, 3:
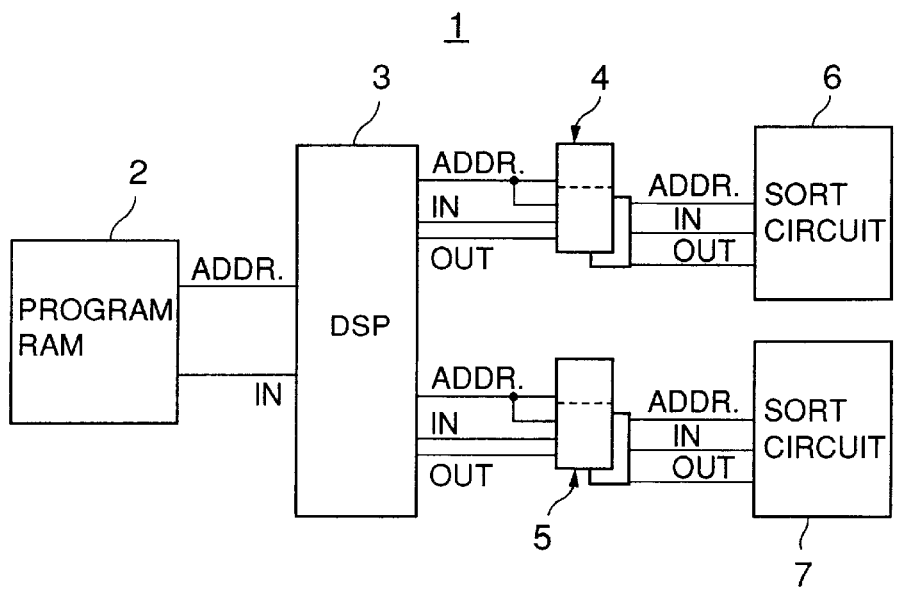
FIG. 2 is an illustration for explaining a sequence of another operation performed by the conventional data processing apparatus.
FIG. 3 is a block diagram of a geometry processing unit according to an embodiment of the present invention.

FIG. 3 is a block diagram of the geometry processing unit 1 according to an embodiment of the present invention. The geometry processing unit 1 comprises a program RAM 2, a digital signal processor (hereinafter referred to as DSP) 3, data RAMs 4 and 5 and sort circuits 6 and 7. The program RAM stores programs which are provided to the DSP 3. The program RAM 2 and the DSP 3 are connected to each other by a bus such as an address bus. The DSP 3 reads data stored in the data RAMs 4 and 5 so as to perform predetermined operations on the read data based on the programs provided by the program RAM 2. The DSP and each of the data RAMs 4 and 5 are connected to each other by buses such as a data bus and an address bus. Each of the data RAMs 4 and 5 stores the resultant data of calculation output from the DSP 3. The sort circuits 6 and 7 are connected to the data RAMs 4 and 5, respectively, by buses such as an address bus and a data bus.

Each of the data RAMs 4 and 5 has a double-buffer structure. In this embodiment, the two data RAMs 4 and 5, which have the same structure, are provided in the geometry processing apparatus since the DSP 3 is generally structured to used two memories. However, the present invention does not require a plurality of memories connected to the DSP 3, and only the data RAM 4 and the sort circuit 6 can be used to achieve the present invention.

Figure 4:
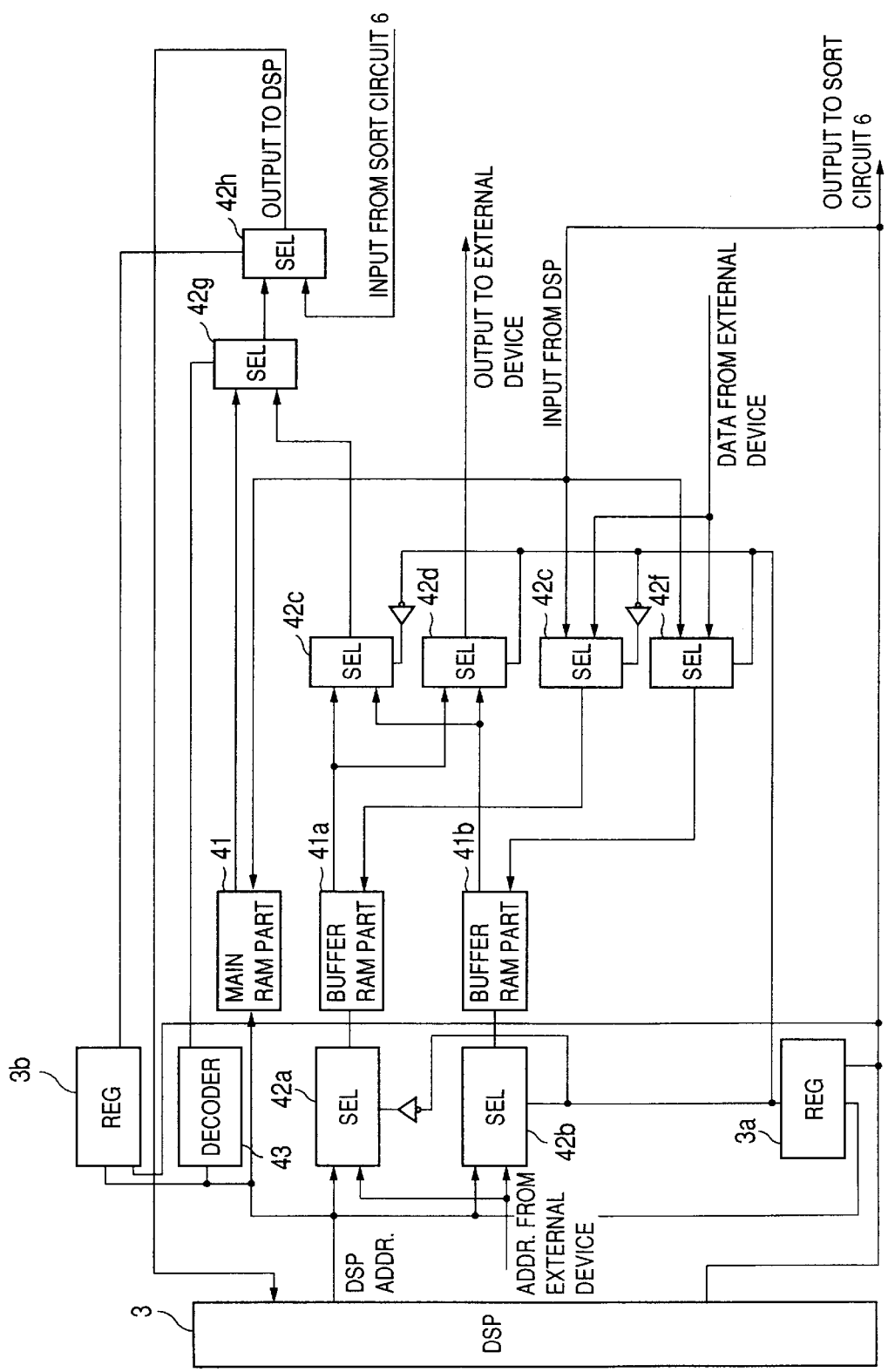
FIG. 4 is a block diagram of one of data RAMs shown in FIG. 3.

FIG. 4 is a block diagram of the data RAM 4. The data RAM 4 comprises a main RAM part 41 and two buffer RAM parts 41a and 41b. The main RAM 41 has an address terminal and a data input terminal so that the DSP address is provided to the address terminal and data is provided to the data input terminal.

The buffer RAM part 41a has an address terminal and a data input terminal. The address terminal of the buffer RAM part 41a is connected to a selector 42a so that one of the DSP address and an address from an external device or circuit (not shown in the figure) is provided to the address terminal by selectively switching the selector 42a. The data input terminal of the buffer RAM part 41b is connected to a selector 42e so that data is provided from one of the DSP 3 and the external device by selectively switching the selector 42e.

The buffer RAM part 41b has an address terminal and a data input terminal. The address terminal of the buffer RAM part 41b is connected to a selector 42b so that one of the DSP address and an address from the external device is provided to the address terminal by selectively switching the selector 42b. The data input terminal of the buffer RAM part 41b is connected to a selector 42f so that data is provided from one of the DSP 3 and the external device by selectively switching the selector 42f.

The buffer RAM part 41a has a data output terminal which is connected to selectors 42c and 42d so that the data in the buffer RAM part 41a is output to both the selector 42c and the selector 42d. Similarly, the buffer RAM part 41b has a data output terminal which is connected to selectors 42c and 42d so that the data in the buffer RAM part 41b is output to both the selector 42c and the selector 42d. The output of the selector 42c is provided to a selector 42g, and the output of the selector 42d is provided to the external device. The selector 42g selects one of the outputs of the main RAM part 41 and the selector 42c, and outputs the selected output to a selector 42h. Data is also input to the selector 42h from the sort circuit 6. The selector 42h selects one of the outputs of the selector 42g and the sort circuit 6, and provides the selected output data to the DSP 3.

The selector 42a and the selector 42b are controlled so that when one of the selectors 42a and 42b is selecting the DSP address, the other one of the selectors 42a and 42b selects the address of the external device. Similarly, the selector 42e and the selector 42f are controlled so that when one of the selectors 42e and 42f is selecting the data from the DSP 3, the other one of the selectors 42e and 42f selects the data of the external device. Additionally, the selector 42c and the selector 42d are controlled so that when one of the selectors 42c and 42d is selecting the output data of the buffer RAM part 41a, the other one of the selectors 42c and 42d selects the output data of the buffer RAM part 41b. The switching operation of the selectors 42a to 42f are controlled by a data RAM select signal output provided by a register 3a. The switching operation of the selector 42g is controlled by a decode signal provided by a decoder 43 which decodes the DSP address. The switching operation of the selector 42h is controlled by a control signal provided by a register 3b.

Figure 5:
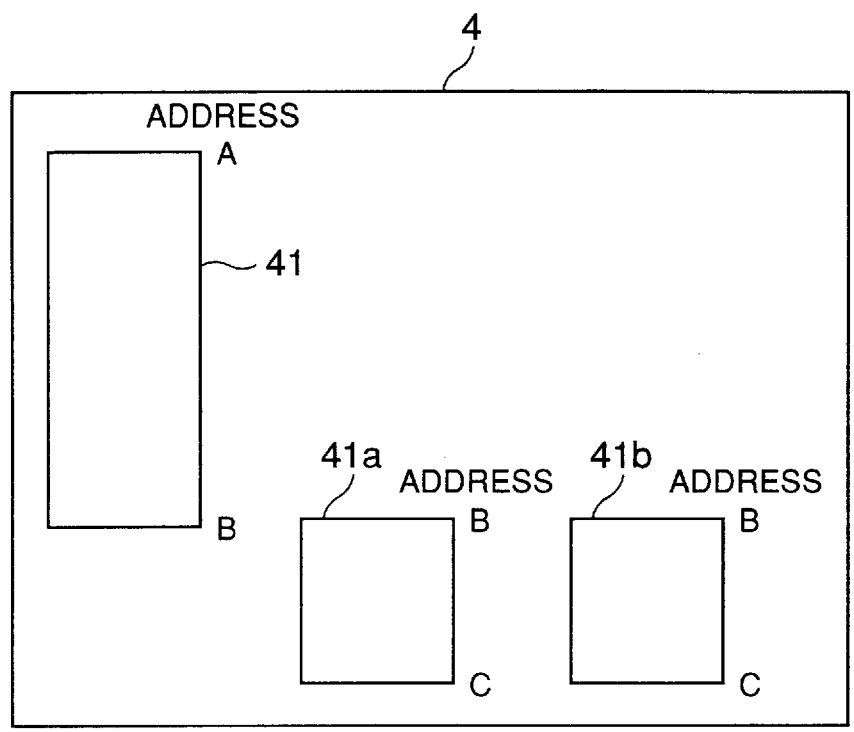
FIG. 5 is an illustration for explaining memory areas corresponding to a main RAM part and buffer RAM parts shown in FIG. 4.

FIG. 5 is an illustration for explaining memory areas corresponding to the main RAM part 41 and the buffer RAM parts 41a and 41b. As shown in FIG. 5, an area from address A to address B is assigned to the main RAM part 41, and an area from address B to address C is provided to the buffer RAM part 41a. Additionally, an area having the same address with the buffer RAM part 41a, that is, an area having an address from address B to address C is assigned to the buffer RAM 41b. It should be noted that the data written in the buffer RAM parts 41a and 41b is the data which is used by the DSP 3 and is required to be sorted.

Figure 6:
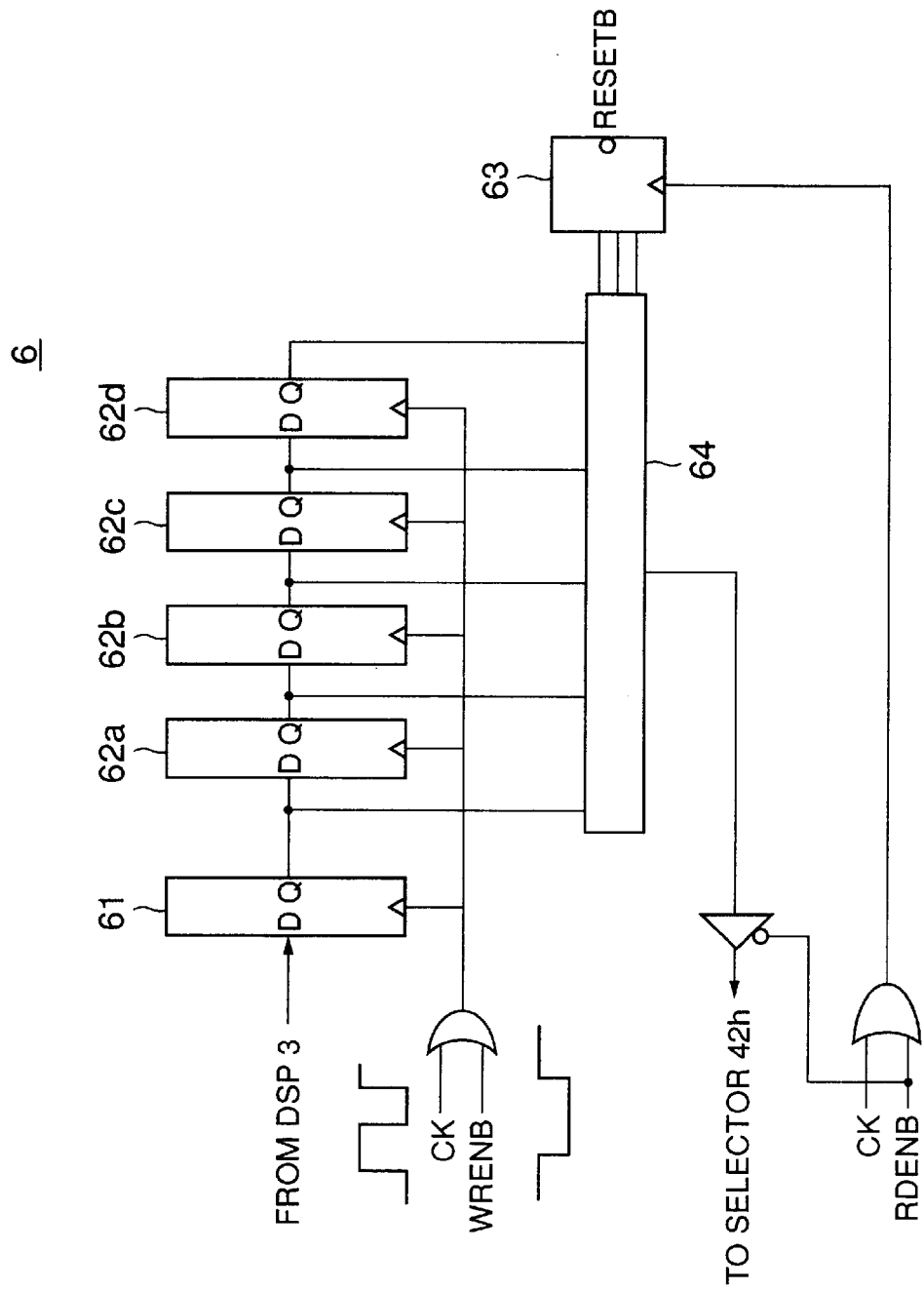
FIG. 6 is a block diagram of one of the sort circuits shown in FIG. 3.

FIG. 6 is a block diagram of the sort circuit 6. The sort circuit 6 comprises an output register 61, registers 62a to 62d, a sequencer 63 and a selector 64. The output register 61 is provided with the data output from the DSP 3. The registers 62a to 62d are arranged serially along a data supply line connected to the register 61 so as to latch the data output from the register 61. A timing terminal of each of the registers 61 and 62a to 62d is provided with an OR result of a clock signal CK and a write enable signal WRENB. The outputs of the registers 61 and 62a to 62d are input to the selector 64. The selector 64 outputs the data supplied from the registers 61 and 62a to 62d after adjusting the order of the data. The adjustment of the selector 64 is controlled by the sequencer 63. The output of the selector 64 is input to the DSP 3 (specifically the selector 42h) when a read enable signal RDENB is at a high level. The sequencer 63 controls the selector 64 based on the OR result of the read enable signal RDENB and the clock signal CK.

According to the above-mentioned structure, when the DSP 3 is writing the result of a calculation in the buffer RAM part 41b, the data (result of the calculation) stored in the buffer RAM part 41a is provided to the output register 61 and subsequently to the registers 62a to 62d. After all the registers 61 and 62a to 62d are occupied by five writing operations, the selector 64 is controlled to rearrange the order of the data in the selector 64. Thus, the data is output from the selector 64 in the rearranged order. Accordingly, the DSP 3 is not required to rearrange the data to be used for calculation. This reduces the number of steps of operation performed by the DSP 3.

Figure 7:
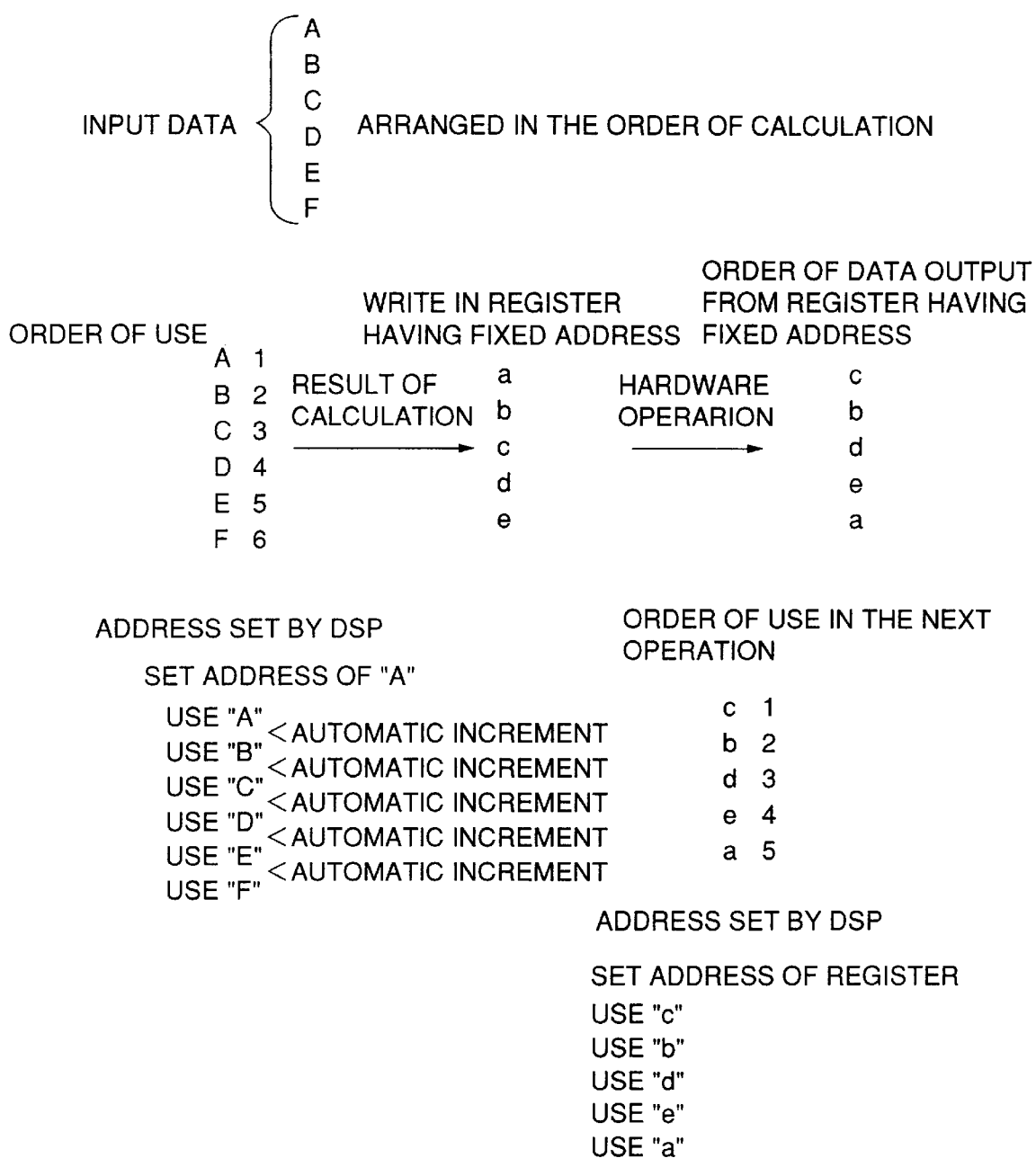
FIG. 7 is an illustration for explaining an operation performed by a sort circuit shown in FIG. 3.

FIG. 7 is an illustration for explaining the operation performed by the sort circuit 6. As appreciated from FIG. 7, the results of calculation "a, b, c, d, e" is rearranged in the order of use by the DSP 3, that is, "c, b, d, e, a".

Figure 8:
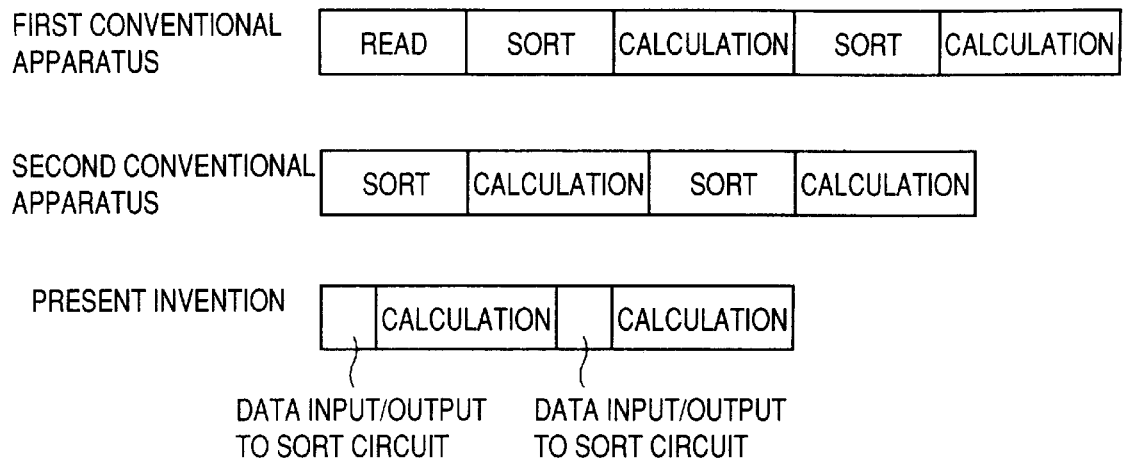
FIG. 8 is an illustration for explaining a difference in the number of steps performed by the processor provided in the data processing apparatus according to the first embodiment of the present invention and that of the processor provided in the conventional data processing apparatuses.

FIG. 8 shows the result of comparison of the number of steps of the operation of the DSP provided in the conventional data processing apparatus (hereinafter referred to as first conventional apparatus) in which no switching function of data RAMs is provided, the number of steps of the operation of the DSP provided in the conventional data processing apparatus (hereinafter referred to as second conventional apparatus) in which data RAMs can be switched, and the number of steps of the operation of the DSP 3 provided in the data processing apparatus according to the present embodiment. As shown in FIG. 8, the processor of the first conventional apparatus must perform operations including a reading operation (writing data in a data RAM), a sorting operation and a calculating operation since the data RAM cannot be switched and the rearrangement of the data is required by the processor itself. The processor of the second conventional apparatus does not need the step corresponding to the above-mentioned reading operation since the switching of the data RAMs can save the time spent on the reading operation. However, the rearrangement of the data is still needed for the second conventional apparatus. On the other hand, the data processing apparatus according to the present embodiment can perform the same calculation with a fewer number of steps than the number of steps required by the above-mentioned conventional apparatuses since the reading operation can be eliminated by appropriately switching the buffer RAM parts 41*a* and 41*b*, and there is no need for the DSP 3 to rearrange the data by the DSP 3 itself.

Figure 9:
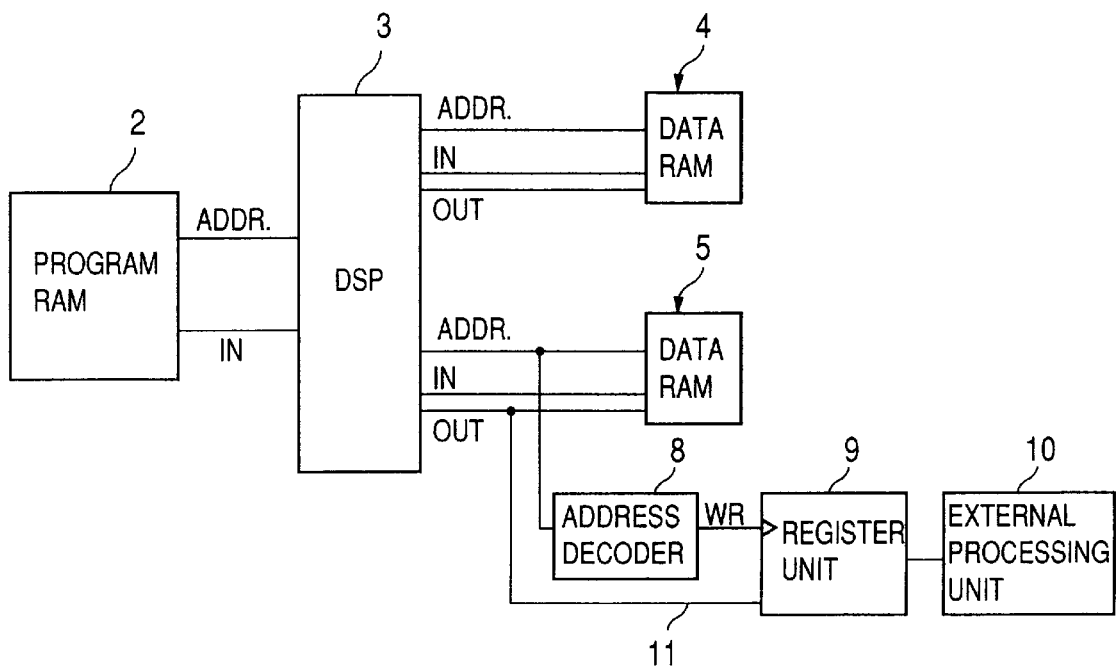
FIG. 9 is a block diagram of a data processing apparatus according to a second embodiment of the present invention.
Figures 10, 11:
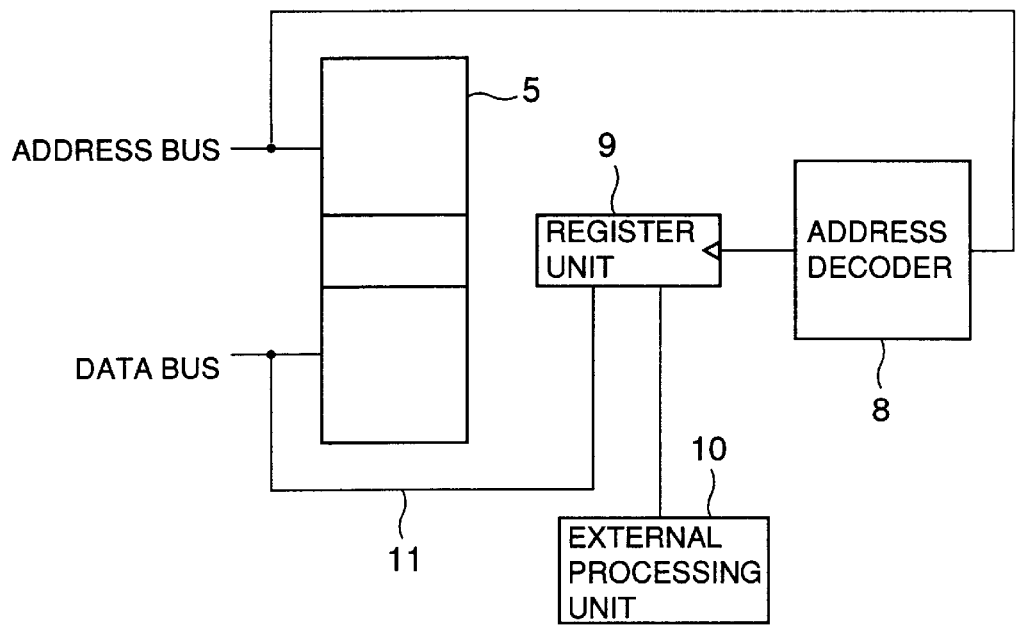
FIG. 10 is a block diagram of a part of the data processing apparatus shown in FIG. 9.
FIG. 11 is an illustration for explaining a writing operation performed by the data processing apparatus according to the second embodiment of the present invention.

FIG. 9 is a block diagram of a data processing apparatus according to a second embodiment of the present invention. In FIG. 9, parts that are shown in FIG. 3 are given the same reference numerals, and descriptions thereof will be omitted. The data processing apparatus shown in FIG. 9 includes an address decoder 8 and a register unit 9 in addition to the structure of the data processing apparatus shown in FIG. 3. The register unit 9 is provided so as to output the resultant data of the DSP 3 to an external processing device 10 which is connected to the register unit 9. FIG. 10 is a block diagram of a part of the data processing apparatus shown in FIG. 9 for explaining a relationship between the address decoder 8, the additional register and the external processing device 10. The address decoder 8 inputs the address provided from the DSP 3 to the data RAM 5 so as to decode the address. The decoded address is output to the register unit 9. The register unit 9 includes a plurality of registers each of which corresponds to each address provided in a part of the data RAM 5. When the decoded address is input from the address decoder 8, the register unit 9 specifies one of the registers in accordance with the output of the address decoder 8. Additionally, the data (result of calculation) output from the DSP 3 is input to the register unit 9 via a data supply line 11 so that the input data, which is stored in the address of the data RAM 5, is stored in the specified register. The external processing device 10 is connected to the additional register 9 so that the additional processing device 10 can read the data (result of calculation of the DSP 3) from the register unit 9.

According to the above-discussed structure, when the DSP 3 writes the result of a calculation in the predetermined address of the buffer RAM part 41*b*, the predetermined address is processed by the address decoder 8 so as to specify a corresponding register in the register unit 9, and the data to be provided to the data RAM 5 (or data RAM 4) is also provided to the register unit 9. That is, the specified address of the data RAM 5 (or data RAM 4) can be duplicated to the predetermined register of the register unit 9. Thus, the writing operation for the data RAM 5 (or data RAM 4) and the writing operation for the register unit 9 are simultaneously performed. This can eliminate execution of the writing operation twice with respect to the DSP 3. Additionally, since the use of the data in the data RAM 5 (or data RAM 4) and the use of data in the register unit 9 are independent from each other, there is no problem when an interim result is needed by one of the DSP 3 and the external processing device 10.

FIG. 11 is an illustration for explaining the above-mentioned operation. As appreciated from FIG. 11, the result of a calculation "C" is simultaneously written in the register unit 9 and the data RAM (internal RAM).

FIG. 12 shows the result of comparison for the number of steps performed by the processor provided in the data processing apparatus according to the present embodiment and that of the processors provided in the above-mentioned first and second conventional apparatuses. It should be noted that, in the second conventional apparatus, the writing operation for the data RAM and the writing operation for the register unit 9 are performed by separate processes so as to cope with a case where the interim result is needed. The first and second conventional apparatuses must perform "a first operation or calculation (and writing operation of the interim result of calculation to the data RAM)", "an outputting operation (writing operation of the interim result of calculation to the register unit)", and "a second operation or calculation (the rest of the calculation)", in that order. On the other hand, according to the data processing apparatus of the present embodiment, since the writing operation for the register unit 9 is simultaneously performed with the writing operation for the interim result of a calculation in the data RAM, the time period spent on the outputting operation of the interim result of a calculation can be eliminated from the process time of the DSP 3. Thus, the DSP 3 of the present embodiment can continuously perform the first operation or calculation and the second operation or calculation, which results in reduction in the number of steps performed by the DSP 3.

Although a double-buffer structure in which a part of data RAM 4 or data RAM 5 is duplicated is used in the above-mentioned embodiments, a double-buffer structure in which the entire data RAM 4 or data RAM 5 is duplicated could be used. Additionally, although the two data RAMs 4 and 5 are provided in the above-mentioned embodiments, the number of data RAMs is not limited to two, and a single data RAM or more than three data RAMs may be provided.

The present invention is not limited to the specifically disclosed embodiments, and variations and modifications may be made without departing from the scope of the present invention.

What is claimed is:

1. A data processing apparatus comprising:
   a processor connected to an address bus and a data bus;
   a data memory storing data to be calculated by said processor, said data memory including a first memory part and a second memory part each of which is connected to said data bus and said address bus, an address structure of said second memory part being identical to an address structure of said first memory part;
   a first selector unit selectively providing one of first address data output from said processor and second address data provided from an external device to said first and said second memory parts so that the first address data is provided to said first memory part when the second address data is provided to said second memory part, and the second address data is provided to said first memory part when the first address data is provided to said second memory part;

a sort circuit which rearranges the data output from said processor in a predetermined order so that the rearranged data is provided to said processor in order of use by said processor; and a second selector unit selectively providing the data output from said processor and data from said external device to said first and second memory parts so that the data output from said processor is provided to said first memory part when the data from said external device is provided to said second memory parts, and the data output from said processor is provided to said second memory part when the data from said external device is provided to said first memory part.

2. The data processing apparatus as claimed in claim 1, further comprising a third selector unit selectively providing data stored in one of said first and second memory parts to one of said processor and said external device.

3. The data processing apparatus as claimed in claim 2, further comprising a fourth selector unit selectively providing to said processor one of the data to be provided to said processor and data from said sort circuit.

4. The data processing apparatus as claimed in claim 1, further comprising a register provided to control a selection of said first selector and said second selector.

5. The data processing apparatus as claimed in claim 1, further comprising a second data memory having a structure identical to that of said data memory.

6. The data processing apparatus as claimed in claim 1, wherein said processor is a digital signal processor.

7. The data processing apparatus as claimed in claim 1, further comprising a program memory storing a program to be provided to said processor so that said processor calculates the data in accordance with the program.

8. The data processing apparatus as claimed in claim 7, wherein the program is directed to geometrical processing.

9. A data processing apparatus comprising:

a processor;

a data memory storing data to be calculated by said processor;

a register unit storing data to be supplied to an external processing unit, said register unit including a plurality of registers;

an address decoder specifying one of said registers corresponding to address data provided to said data memory; and data supply lines to simultaneously provide data from said processor to said data memory and to said register unit.

10. The data processing apparatus as claimed in claim 9, wherein said register unit has an address structure identical to at least a part of said data memory, and wherein said registers correspond to addresses in said part of said data memory.

11. The data processing apparatus as claimed in claim 9, further comprising a program memory storing a program to be used by said processor, and wherein the program is directed to geometrical processing.

* * * * *